3,082,063
PROCESS FOR THE PREPARATION OF POTASSIUM SULPHATE AND HYDROUS POTASSIUM-MAGNESIUM SULPHATES FROM NATURAL KAINITE

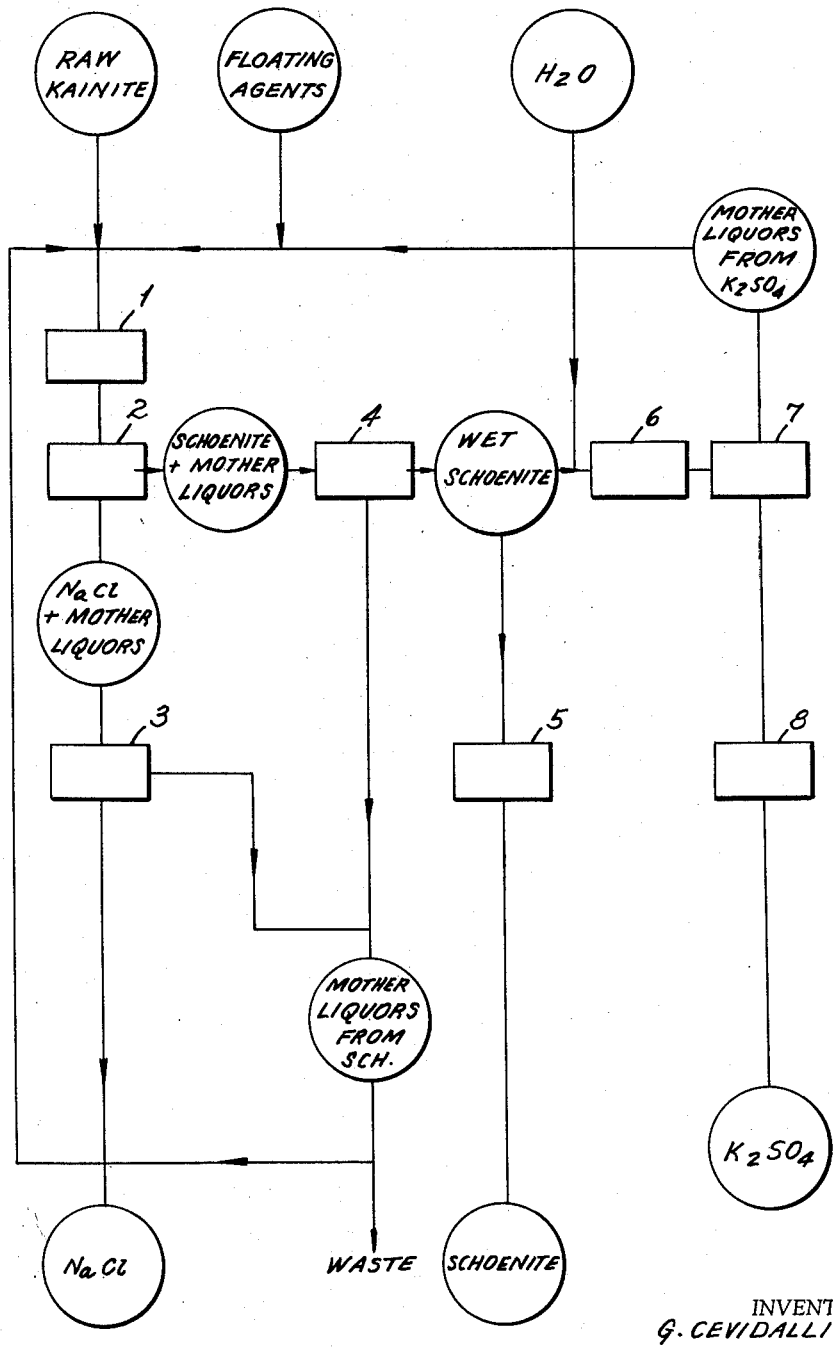

Guidobaldo Cevidalli, Fulvio Marchi, Pietro Saccardo, and Alberto Scarfi, all % Sincat Societa Industriale Catanese S.p.A., Via Principe Eugenio 5, Milan, Italy
Filed Dec. 8, 1959, Ser. No. 858,011
Claims priority, application Italy Dec. 5, 1956
4 Claims. (Cl. 23—117)

The present invention relates to the production of potassium sulphate and magnesium-potassium sulphate, starting from natural kainite.

Since the early times of the potassium salts industry, in Germany, kainite, $KCl.MgSO_4.3H_2O$, has been the object of the investigation as a starting material for producing potassium containing fertilizers. Having in itself the necessary components for obtaining $K_2SO_4$ according to the classic method, it looked at first as the most suitable mineral for this purpose.

Instead it was found very soon that the use of kainite was complicated by difficulties deriving mainly from the presence of NaCl mixed with the mineral, in larger or smaller amounts, and very difficult to separate.

Several were the processes suggested to obviate such a difficulty, some of them actually had also an industrial application. All were however discontinued and the processing of kainite has been completely disregarded since the first years of this century, on various grounds.

It has long been known that by treating "pure" kainite with water in suitable quantity, the kainite undergoes a transformation forming two different products: (1) a solid phase constituted by schoenite crystals, and (2) a liquid phase constituted by a magnesium chloride solution, containing, in solution, also some potassium chloride and potassium sulphate. The schoenite can be separated by filtering and the brine discharged as waste.

In its turn the schoenite can be treated with water in a calculated amount, separating in a solid phase constituted by potassium sulphate, and in a liquid phase formed by an aqueous solution of potassium sulphate and magnesium sulphate.

The potassium sulphate can be separated by filtering and the magnesium sulphate and potassium sulphate solution can be used, in place of water, for treating fresh quantities of kainite, with a higher overall yield.

This process however can be applied only, as mentioned above, to a very high grade, pure kainite, free of or containing only very small quantities of sodium chloride, such as it is very seldom encountered in nature.

Indeed it is known that when it is desired to produce potassium sulphate, even starting from other types of mineral (hartsalz and sylvinite etc.) according to the usual method, the presence of even only limited quantities of NaCl in the intermediate compounds (schoenite, sylvite etc.) makes the process impracticable.

Should such process be applied to natural kainite, it would be necessary to use such an amount of water (or of brine as derived from the filtering of the potassium sulphate) as to dissolve, besides the $MgCl_2$ deriving from the decomposition of the kainite, also all the NaCl present.

In this way a large portion of the potassium sulphate, instead of remaining in the solid state as constituting the schoenite, would be carried away in solution and lost in the brines of magnesium chloride going to the waste. In practice the yield would be reduced to ever lower values with increasing NaCl contents and the process becomes impractical for NaCl contents over 25–30 percent such as are commonly found in the kainite minerals.

To avoid this inconvenience it has recently been proposed to separate the NaCl from the kainite by means of flotation, prior to the treatment, in the same way as it has been done for separating the NaCl from the KCl in the sylvinite minerals. But whereas for the sylvinite, the flotation produce (i.e. the KCl) is a potassium salt of very high grade directly usable as a fertilizer, the direct flotation of kainite minerals yields only a product of low $K_2O$ content, that has to undergo a further treatment, such as for instance the one outlined above. In this way the cost of flotation of the excessively increases the cost of the $K_2O$ produced.

It is an object of the present invention to produce magnesium-potassium sulphate and potassium sulphate starting from raw natural kainite, containing even large amounts of sodium chloride.

It is a further object of the present invention to produce magnesium-potassium sulphate and potassium sulphate starting from raw kainite in a process which provides a high potassium yield.

The present process is based on the discovery that when raw kainite containing more than 12% of NaCl has been treated with water, or mother liquors of potassium sulphate, with the lowest water/kainite ratio sufficient to carry in solution the magnesium chloride obtained from the decomposition of the kainite, after filtering, there is obtained a solid phase constituted by a mixture of schoenite and sodium chloride.

The solid phase thus obtained, constituted by schoenite mixed with NaCl, would be unsuitable for supplying potassium sulphate by treating it with water just because of the presence of NaCl. But we have found that this NaCl can be easily separated from the schoenite if the mixture of schoenite and NaCl such as it is obtained by filtering, is subjected to flotation in the presence of suitable flotation reagents.

Still better, the NaCl can be separated from the schoenite if the pulp, as obtained from the transformation of the kainite and constituted by schoenite plus solid NaCl suspended in the magnesium chloride solution deriving from the conversion, is directly subjected to the flotation process.

Contrary to prior opinion the brine rich in magnesium chloride obtained from the conversion of the raw kainite into schoenite, has proved fit, in the presence of suitable flotation reagents, for the use as flotation brine for the separation, through flotation, of the schoenite from NaCl. In this way there is the following remarkable advantage, in respect to the usual flotation processes of mineral, for instance kainite; while for the flotation of mineral these have to be carefully ground down to a partial size such as to assure the liberation of the single mineralogical constituents, in our process the liberation of the schoenite freshly formed from the previously existing halite is obtained without any particular expensive treatment.

Our process can be schematically described referring to the drawing:

The raw kainite, mixed with the mother liquors obtained from the filtering of the potassium sulphate, is charged in a suitable container 1 provided with a stirring device, where it is converted into solid schoenite and solid NaCl, suspended in a brine of $MgCl_2$ etc. The pulp thus obtained is subjected in 2 to a flotation process, following which the NaCl is separated as a residue, and filtered in 3. The schoenite obtained in the froths is filtered in 4; the mother liquor is partially discharged to waste, in order to eliminate the magnesium chloride deriving from the decomposition of the kainite, and partly is recycled to 1. The moist solid schoenite is partly dried in 5, to give hydrated potassium and magnesium sulphate, and partly converted with water in 6, in a suitable converter. The result is a pulp of solid potassium sulphate in a solution of potassium sulphate and magnesium sulphate.

After filtering in 7, the potassium sulphate is dried in

8. The mother liquor is used to convert new kainite into schoenite.

It has been found that saturated and unsaturated fatty acids, with from 6 to 18 carbon atoms, free as well as combined to form salts, may be used as selective floatation reagents for schoenite. In particular the unsaturated acids, containing 10 or more carbon atoms have proved to be more efficient, while the acids having a shorter chain are more efficient if saturated. As coadjuvants of the fatty acids there can be advantages used dispersing agents such as starch, dextrine, guar gum, tannin and the like.

It is known that in all flotation processes, the flotation reagents have to be intimately mixed for a certain length of time, prior to flotation with the crystals of the mineral to be treated.

Such mixing operation is commonly called "conditioning." We have discovered that such a conditioning is obtained very conveniently and in a way such as to then allow high flotation yields, in the flotation reagents and dispersing agents are introduced in the same container and at the same time at which the transformation of the kainite into schoenite takes place.

The fact that schoenite is formed in the precense of the agents that have to be adsorbed therein to allow its flotation, affords a saving in the quantity thereof used.

The process, as thus described by us, offers the great advantage, in respect to others already known (refer to C. N. Hake, U.S. P. 229,249), of not having to dissolve the NaCl contained in the kainite, but to leave it undissolved together with the schoenite, thus allowing use of only the quantity of water (or of mother liquors of the potassium sulphate) sufficient for dissolving the $MgCl_2$ deriving from the kainite, and allowing the transformation into schoenite.

In practice, if the NaCl should have to be eliminated through dissolution, the schoenite yield would be reduced to very low values, and for such a reason the Hake process and the lke result in impractical yields for kainites containing 30 to 40% of NaCl.

The process as found by us offers beside the great advantages, in respect to the preliminary flotation of the kainite, of inserting the flotation in a single harmonious working cycle, wherein the flotation is effected under particularly favourable conditions and wherein the potassium salt to be separated, namely the schoenite, is already enriched in respect to the starting kainite, since the magnesium chloride has been taken away from the crystalline structure.

The following example, which is intended to illustrate without limiting the present invention will serve to better explain our process: 320 gr. of kainite containing 13.24% of $K_2O$ and 28.5% of NaCl are stirred for three hours with 280.6 gr. of brine constituting the mother liquors filtered from 26.40 gr. of $K_2SO_4$ containing 48.16% $K_2O$, obtained by treating 151 gr. of schoenite with 158 gr. of $H_2O$: in the same apparatus 150 ml. of brine from a previous flotation are charged.

After such a treatment the kainite is transformed to schoenite, and the NaCl is left for the greater part undissolved. In the same apparatus where the convention takes place, two hours from the beginning, the "flotation agents" are admixed.

In this example the amount is the following: a solution of starch, corresponding to 0.006 gr. of starch, as a dispersing agent; 0.05 gr. of caprylic acid as a collector; and 0.02 gr. of cresylic acid as a frother.

At the end of conversion the pulp is floated in a conventional floating cell. Schoenite is collected in the froth, while NaCl remains in the tails.

The brine collected after filtration is discharged in part, while a portion of 150 ml. is recycled. The NaCl obtained after filtration is discharged or used as such. The schoenite, after filtration, consists, calculated on a dry basis, of 243 gr. of schoenite, with a $K_2O$ content of 22.6%. Of these, 92 gr. are produced as such, while 151 gr. are decycled for the $K_2SO_4$ production. The total yield of $K_2O$, based on the kainite used, is the following:

|  | Gr. | Percent |
| --- | --- | --- |
| $K_2O$ in the kainite | 42.37 | 100 |
| $K_2O$ in the $K_2SO_4$ | 12.67 | 29.93 |
| $K_2O$ in the schoenite produced = (gr. 92×22.6%) | 20.79 | 49.02 |
| Total | 33.46 | 78.95 |

It is to be understood that all the data set out above have no limiting value whatsoever, and the invention shall be limited only by the appended claims.

This application is a continuation-in-part of application Serial No. 644,332, filed March 6, 1957, now abandoned.

What we claim is:

1. A process for the conversion of natural kainite containing sodium chloride as an impurity into schoenite and potassium sulfate comprising the steps of admixing the impure kainite with recycled potassium sulfate mother liquir, the reaction mixture containing sufficient water to maintain magnesium chloride formed from decomposition of the kainite in solution, thereby forming a suspension of solid schoenite and solid sodium chloride in an aqueous magnesium chloride solution, treating the suspended solids with a flotation agent selected from the group consisting of saturated and unsaturated fatty acids having from 6 to 18 carbon atoms in a conditioning zone to facilitate separation of the schoenite from the sodium chloride, removing the solids from the conditioning zone in the form of a pulp and separating therefrom, a sodium chloride residue, partially drying the moist schoenite remaining in the pulp and removing a portion of the partially dried schoenite as product, treating the residual partially dried schoenite with water to convert the same to a pulp of solid potassium sulfate in a solution of potassium sulfate and magnesium sulfate, separating the solid potassium sulfate as product and recycling the mother liquor for conversion of kainite to schoenite.

2. The process of claim 1 in which the weight ratio of the mother liquors of potassium sulfate and kainite, calculated on the pure mineral contents, is between 0.98 and 1.5.

3. The process of claim 1 in which the flotation agent has included therewith a dispersing agent from the group consisting of starch, dextrine, guar gum, and tannin.

4. A process for the conversion of natural kainite containing sodium chloride as an impurity into schoenite and potassium sulfate, comprising the steps of:
   (1) treating the impure kainite with an aqueous mixture constituted of the filtrates recyled from steps (4) and (8) infra, the reaction mixture containing sufficient water to maintain magnesium chloride formed from decomposition of the kainite in the solution, thereby forming a suspension of schoenite and sodium chloride in an aqueous magnesium chloride solution;
   (2) treating the suspension of schoenite and sodium chloride with a flotation agent selected from the group consisting of saturated and unsaturated fatty acids having from 6 to 18 carbon atoms in a conditioning zone, the schoenite remaining in the froth and the sodium chloride remaining in the tails;
   (3) separating the schoenite from the sodium chloride;
   (4) filtering the schoenite separated from the sodium chloride in step (3) and recycling a portion of the filtrate to step (1);
   (5) partially drying the moist schoenite removed from step (4) and removing a portion of the partially dried schoenite as product;
   (6) treating the residual partially dried schoenite with water to convert the same to a pulp of solid potassium sulfate in a solution of potassium sulfate and magnesium sulfate;

(7) filtering and drying the potassium sulfate and removing the same as product; and (8) recycling the filtrate from step (7) to step (1) for conversion of kainite to schoenite.

References Cited in the file of this patent

UNITED STATES PATENTS

| | | |
|---|---|---|
| 2,766,885 | Marullo et al. | Oct. 16, 1956 |
| 2,902,343 | Saccardo | Sept. 1, 1959 |
| 2,902,344 | Cevidalli et al. | Sept. 1, 1959 |